(12) United States Patent
Lee et al.

(10) Patent No.: US 11,889,475 B2
(45) Date of Patent: Jan. 30, 2024

(54) METHOD FOR ALLOCATING AND RESERVING RESOURCE FOR SIDELINK COMMUNICATION, AND APPARATUS THEREFOR

(71) Applicant: Electronics and Telecommunications Research Institute, Daejeon (KR)

(72) Inventors: Jung Hoon Lee, Daejeon (KR); Jae Heung Kim, Sejong-si (KR); Cheul Soon Kim, Daejeon (KR); Sung Hyun Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/519,197

(22) Filed: Nov. 4, 2021

(65) Prior Publication Data
US 2022/0061029 A1 Feb. 24, 2022

Related U.S. Application Data

(63) Continuation of application No. 16/932,531, filed on Jul. 17, 2020, now Pat. No. 11,317,380.

(30) Foreign Application Priority Data

Jul. 19, 2019 (KR) .................. 10-2019-0087895
Oct. 29, 2019 (KR) .................. 10-2019-0135798
(Continued)

(51) Int. Cl.
*H04W 72/02* (2009.01)
*H04W 4/40* (2018.01)
(Continued)

(52) U.S. Cl.
CPC ............. *H04W 72/02* (2013.01); *H04W 4/40* (2018.02); *H04W 8/24* (2013.01); *H04W 92/18* (2013.01)

(58) Field of Classification Search
CPC . H04L 5/0094; H04L 5/0053; H04L 27/2602; H04L 5/0044; H04L 1/1896;
(Continued)

(56) References Cited

U.S. PATENT DOCUMENTS 9,794,976 B2 * 10/2017 Sartori ............. H04W 72/0406
2016/0128066 A1 5/2016 Park et al.
(Continued)

FOREIGN PATENT DOCUMENTS

WO 2018201384 A1 11/2018
WO 2019029375 A1 2/2019
WO 2019075238 A1 4/2019

*Primary Examiner* — Congvan Tran
(74) *Attorney, Agent, or Firm* — William Park & Associates Ltd.

(57) ABSTRACT

A method for transmitting data in sidelink communication, performed by a transmitting terminal, may comprise transmitting first control information including first resource allocation information for a first data transmission resource and second resource allocation information for a second data transmission resource; transmitting data through the first data transmission resource; transmitting second control information including the first resource allocation information for the first data transmission resource and the second resource allocation information for the second data transmission resource; and transmitting data through the second data transmission resource.

10 Claims, 11 Drawing Sheets

(30) Foreign Application Priority Data

Apr. 1, 2020 (KR) .................. 10-2020-0039928
Jun. 19, 2020 (KR) .................. 10-2020-0074705

(51) Int. Cl.
*H04W 8/24* (2009.01)
*H04W 92/18* (2009.01)

(58) Field of Classification Search
CPC ... H04L 1/0072; H04L 5/0055; H04L 5/0007;
H04L 67/12; H04W 72/02; H04W 4/40;
H04W 8/24; H04W 92/18; H04B 7/0695
See application file for complete search history.

(56) References Cited

U.S. PATENT DOCUMENTS

| | | | |
|---|---|---|---|
| 2018/0035427 A1 | 2/2018 | Gupta et al. | |
| 2018/0234980 A1 | 8/2018 | Li et al. | |
| 2019/0090293 A1* | 3/2019 | Su | H04W 8/005 |
| 2019/0173612 A1* | 6/2019 | Kimura | H04L 5/0044 |
| 2019/0174530 A1 | 6/2019 | Kim et al. | |
| 2019/0190643 A1* | 6/2019 | Lee | H04L 5/0039 |
| 2019/0281603 A1 | 9/2019 | Oh et al. | |
| 2020/0008183 A1* | 1/2020 | Chen | H04W 72/048 |
| 2020/0107234 A1 | 4/2020 | Kim et al. | |
| 2020/0127793 A1 | 4/2020 | Kim et al. | |
| 2020/0337067 A1 | 10/2020 | Chae et al. | |
| 2021/0127361 A1 | 4/2021 | Yasukawa et al. | |
| 2021/0143963 A1 | 5/2021 | Matsuda et al. | |
| 2021/0306824 A1* | 9/2021 | Li | H04L 1/1887 |

\* cited by examiner

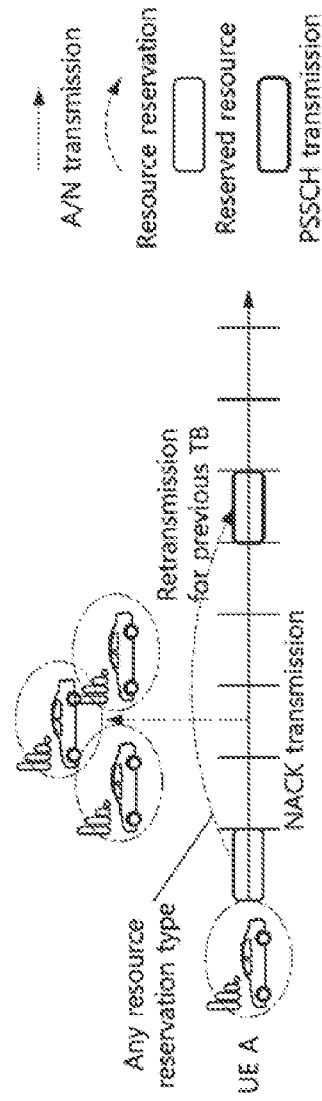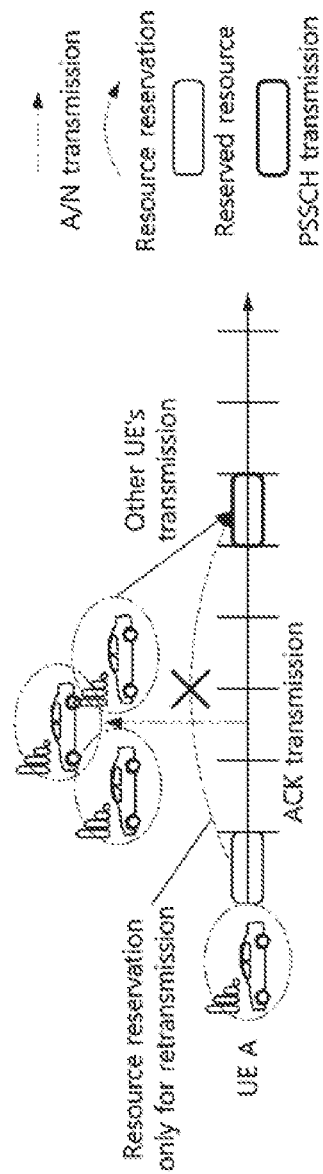

METHOD FOR ALLOCATING AND RESERVING RESOURCE FOR SIDELINK COMMUNICATION, AND APPARATUS THEREFOR

CROSS-REFERENCE TO RELATED APPLICATIONS

This application is a continuation application of U.S. patent application Ser. No. 16/932,531, filed on Jul. 17, 2020, and claims priority to Korean Patent Applications No. 10-2019-0087895 filed on Jul. 19, 2019, No. 10-2019-0135798 filed on Oct. 29, 2019, No. 10-2020-0039928 filed on Apr. 1, 2020, and No. 10-2020-0074705 filed on Jun. 19, 2020 with the Korean Intellectual Property Office (KIPO), the entire contents of which are hereby incorporated by reference.

BACKGROUND

1. Technical Field

The present disclosure relates generally to sidelink communication methods in a mobile communication system, and more specifically, to methods for allocating and reserving resources for sidelink communication, and apparatuses for the same.

2. Related Art

In the 3rd generation partnership project (3GPP), a new radio (NR) standardization phase 1 has been completed in Release-15, and a standardization phase 2 has been started in Release-16, so that new features of the NR system are being discussed. One of the representative functions under discussion is NR vehicular-to-everything (V2X) communication. The V2X is a technology that supports communications in various scenarios such as between vehicles, between a vehicle and an infrastructure, and between a vehicle and a pedestrian based on device-to-device (D2D) communications of the long term evolution (LTE) system, and is also continuing to develop. The NR V2X is also being discussed in the NR with the start of Release 16.

Three types of data transmission schemes are being discussed in the NR V2X. They are a unicast scheme for transmitting data to a specific terminal, a broadcast scheme for transmitting the same data to all terminals, and a groupcast scheme for transmitting data to a group consisting of a plurality of terminals. In the case of unicast data transmission, a specific terminal receives data transmitted to itself, and transmits acknowledgement (ACK) or negative acknowledgment (NACK) feedback according to whether the data has been normally received or not. When confirming that the ACK is transmitted as a result of identifying the ACK/NACK feedback, a transmitting terminal may determine that the specific terminal has successfully received the data. On the other hand, when it is confirmed that the NACK is transmitted, the transmitting terminal may determine that the specific terminal has failed to receive the data, and may transmit additional information according to a HARQ scheme or retransmit the same data to increase the probability of receiving the data at the specific terminal. In the case of broadcast scheme of transmitting the same data to all terminals, since it is difficult to receive ACK/NACK feedbacks from all the terminals, and it is difficult to determine whether the data has been normally received at each of all the terminals, the ACK/NACK feedback procedure is not usually applied. In case of system information, which is representative information transmitted in the broadcast scheme, the ACK/NCAK feedback procedure is not applied. Therefore, the system information is periodically broadcast to solve the problem that it cannot be determined whether the data has been normally received at each of all the terminals. In the case of the groupcast scheme newly discussed in the NR V2X, since information is transmitted to a plurality of terminals, it is possible to periodically transmit necessary information without the ACK/NACK feedback procedure as in the broadcast scheme. However, unlike the broadcast scheme, when the number of target receiving terminals are limited and the type of data is a type of data that should be received within a predetermined time, efficient and stable data transmission and reception can be enabled by applying the ACK/NACK feedback procedure similarly to the unicast scheme.

In addition, in case of power control for sidelink, a transmission power of the transmitting terminal may be appropriately adjusted according to a transmission environment, thereby increasing data reliability at the receiving terminal, and mitigating interferences to other terminals. It also increases energy efficiency by reducing unnecessary transmission power usage. In the case of power control, there are an open-loop power control scheme, in which the transmission power is set with a value determined by a transmitting side in consideration of a given configuration and a measured environment, and a closed-loop power control scheme, in which the transmitting side adjusts a previously set power value by receiving a transmit power control (TPC) command from a receiving side of data.

SUMMARY

Accordingly, exemplary embodiments of the present disclosure provide methods for transmitting data for sidelink communication.

Accordingly, exemplary embodiments of the present disclosure provide methods for receiving data for sidelink communication.

Accordingly, exemplary embodiments of the present disclosure provide a terminal apparatus for sidelink communication.

According to an exemplary embodiment of the present disclosure, a method for transmitting data in sidelink communication, performed by a transmitting terminal, may comprise transmitting first control information including first resource allocation information for a first data transmission resource and second resource allocation information for a second data transmission resource; transmitting data through the first data transmission resource; transmitting second control information including the first resource allocation information for the first data transmission resource and the second resource allocation information for the second data transmission resource; and transmitting data through the second data transmission resource.

The first control information and the second control information may redundantly indicate the first resource allocation information for the first data transmission resource and the second resource allocation information for the second data transmission resource.

A maximum number of resource allocation information for data transmission resources, which each of the first control information and the second control information is capable of including, may be configured by a base station.

Each of the first control information and the second control information may include information indicating which order each configuration information has within the maximum number.

Data transmission resources indicated by the maximum number of resource allocation information may be located within a predetermined time period.

Each of the first control information and the second control information may be a first stage sidelink control information (SCI).

According to another exemplary embodiment of the present disclosure, a method for receiving data in sidelink communication, performed by a receiving terminal may comprise detecting first control information including first resource allocation information for a first data transmission resource and second resource allocation information for a second data transmission resource; when the first control information is successfully received, receiving data through the first data transmission resource; detecting second control information including the first resource allocation information for the first data transmission resource and the second resource allocation information for the second data transmission resource; and when the second control information is successfully received, receiving data through the second data transmission resource.

The first control information and the second control information may redundantly indicate the first resource allocation information for the first data transmission resource and the second resource allocation information for the second data transmission resource.

A maximum number of resource allocation information for data transmission resources, which each of the first control information and the second control information is capable of including, may be configured by a base station.

Each of the first control information and the second control information may include information indicating which order each configuration information has within the maximum number.

Data transmission resources indicated by the maximum number of resource allocation information may be located within a predetermined time period.

Each of the first control information and the second control information may be a first stage SCI.

The method may further comprise, when the first control information is not successfully received, receiving data through the first data transmission resource indicated by the first resource allocation information of the second control information.

The method may further comprise, when the second control information is not successfully received, receiving data through the second data transmission resource indicated by the second resource allocation information of the first control information.

According to another exemplary embodiment of the present disclosure, a terminal in sidelink communication may comprise a processor; a memory electronically communicating with the processor; and instructions stored in the memory, wherein when executed by the processor, the instructions cause the terminal to: transmit first control information including first resource allocation information for a first data transmission resource and second resource allocation information for a second data transmission resource; transmit data through the first data transmission resource; transmit second control information including the first resource allocation information for the first data transmission resource and the second resource allocation information for the second data transmission resource, and transmit data through the second data transmission resource.

The first control information and the second control information may redundantly indicate the first resource allocation information for the first data transmission resource and the second resource allocation information for the second data transmission resource.

A maximum number of resource allocation information for data transmission resources, which each of the first control information and the second control information is capable of including, may be configured by a base station.

Each of the first control information and the second control information may include information indicating which order each configuration information has within the maximum number.

Data transmission resources indicated by the maximum number of resource allocation information may be located within a predetermined time period.

Each of the first control information and the second control information may be a first stage SCI.

Using various exemplary embodiments of the present disclosure, sidelink communication can be efficiently performed. In particular, when important control information is redundantly transmitted, the receiving terminal can successfully receive data even when only one of the redundantly transmitted control information is received. In addition, even when only one of the redundantly transmitted control information is received, the position of the reserved resource within a predetermined time period can be known, thereby reducing collisions of reserved resources between terminals. Therefore, the performance of the communication system can be improved.

BRIEF DESCRIPTION OF DRAWINGS

Exemplary embodiments of the present disclosure will become more apparent by describing in detail embodiments of the present disclosure with reference to the accompanying drawings, in which:

FIGS. 10 to 12 are conceptual diagrams for describing transmission resource allocation in a communication system.

Figure 1:
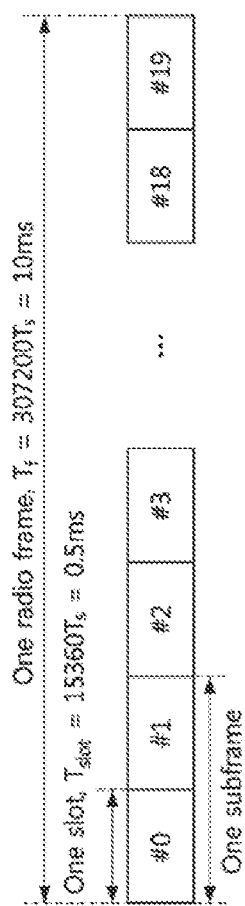
FIG. 1 is a conceptual diagram illustrating a type 1 frame structure in the LTE system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

The 3GPP Long Term Evolution (LTE) system, which is one of the conventional mobile communication technologies, supports three types of frame structures. The first is a type 1 frame structure applicable to Frequency Division Duplex (FDD), the second is a type 2 frame structure applicable to Time Division Duplex (TDD), and the last is a type 3 frame structure for transmission in an unlicensed frequency band.

FIG. 1 is a conceptual diagram illustrating a type 1 frame structure in the LTE system.

Referring to FIG. 1, one radio frame may have a length of 10 ns (307,200 Ts), and comprise 10 subframes. Here, $T_s$ is a sampling time and has a value of $1/(15 \text{ kHz} \times 2048)$. Each subframe has a length of 1 ms, and one subframe includes two slots each having a length of 0.5 ms. One slot consists of seven OFDM symbols in case of a normal CP and six OFDM symbols in case of an extended CP.

Figure 2:
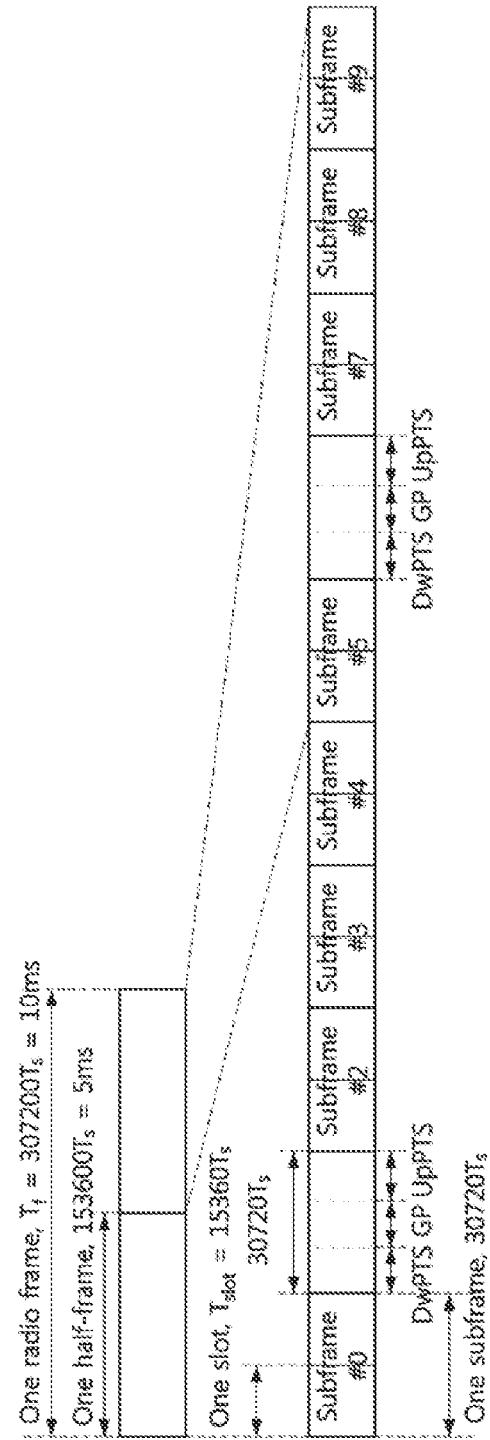
FIG. 2 is a conceptual diagram illustrating a type 2 frame structure in the LTE system.

FIG. 2 is a conceptual diagram illustrating a type 2 frame structure in the LTE system.

Referring to FIG. 2, the relationship among a radio frame, subframes, and slots, and their lengths are the same as in the case of type 1. As a difference, one radio frame may be composed of downlink subframe(s), uplink subframe(s), and special subframe(s). The special subframe(s) may exist between a downlink subframe and an uplink subframe, and may include a Downlink Pilot Time Slot (DwPTS), a Guard Period (GP), and an Uplink Pilot Time Slot (UpPTS). One radio frame may include two special subframes when a downlink-uplink switching periodicity is 5 ms, and one special subframe when the downlink-uplink switching periodicity is 10 ms. The DwPTS may be used for cell search, synchronization, or channel estimation, and the GP may be a period for removing interference generated in uplink of a base station due to a multipath delay difference of terminals. In the UpPTS, a Physical Random Access Channel (PRACH) or a Sounding Reference Signal (SRS) may be transmitted.

In the LTE system, a Transmission Time Interval (TTI) means a basic time unit in which an encoded data packet is transmitted through a physical layer signal. The LTE release 14 defines short TTI-based data transmission to meet low latency requirements. To distinguish the TTI up to release 14 from the short TTI, the TTI up to release 14 may be referred to as a 'base TTI' or 'regular TTI'.

The base TTI of the LTE system consists of one subframe. That is, a time axis length of a Physical Resource Block (PRB) pair, which is a minimum unit of resource allocation, is 1 ms. In order to support transmission of the 1 ms TTI, physical signals and channels are also mostly defined on a subframe basis. For example, a Cell-specific Reference Signal (CRS), a Physical Downlink Control Channel (PDCCH), a Physical Downlink Shared Channel (PDSCH), a Physical Uplink Control Channel (PUCCH) and a Physical Uplink Shared Channel (PUSCH) may exist for each subframe. On the other hand, a Primary Synchronization Signal (PSS) and a Secondary Synchronization Signal (SSS) may be present in every fifth subframe, and a Physical Broadcast Channel (PBCH) may be present in every tenth subframe. Meanwhile, one radio frame consists of 10 subframes and has a time axis length of 10 ms. The radio frame is identified by a System Frame Number (SFN), which is used to define transmission of a signal (e.g., paging, channel estimation reference signal, channel state information reporting) having a transmission periodicity longer than one radio frame. A periodicity of the SFN is 1024.

In the LTE system, the PBCH is a physical layer broadcast channel that conveys the most essential system information called a Master Information Block (MIB). The PBCH is transmitted every tenth subframe and is transmitted once in one radio frame. The MIB should be transmitted with the same information during four radio frames, after which it may change depending on the situation of the system. This is called a PBCH TTI (=40 ms) for convenience. In this case, the transmitted MIB includes 3 bits indicating a system band, 3 bits related to a Physical Hybrid ARQ Indicator Channel (PHICH), 8 bits for the SFN, 10 bits reserved for future use, and 16 bits for a cyclic redundancy check (CRC). That is, the MIB is comprised of a total of 40 bits. The SFN identifying the radio frame consists of a total of 10 bits (B9~B0), and only 8 bits (B9~B2) that are most significant bits (MSB) of the SFN are transmitted through the PBCH. Accordingly, the information on the corresponding SFN, which is transmitted through the PBCH, is not changed during four radio frames. The remaining 2 bits (B1~B0) that are least significant bits (LSB) of the SFN changing during four radio frames are implied through a scrambling sequence used for the PBCH without being explicitly given by the MIB transmitted through the PBCH. As the scrambling sequence of the PBCH, a gold sequence generated by being initialized with a cell identifier (ID) is used, and the PBCH scrambling sequence is newly initialized by an equation of mod (SFN, 4) with a periodicity of four radio frames. Therefore, a gold sequence, which is newly generated by being initialized with a cell ID for each radio frame whose LSB 2-bits of the SFN is '00', is applied as the scrambling sequence. Gold sequences, which are generated successively thereafter, are used for PBCH scrambling in radio frames whose 2 bits of the SFN ends with '01', '10', and '11'. Accordingly, the terminal acquiring a cell ID during an initial cell search may implicitly identify information on '00', '01', '10', or '11' of the LSB 2 bits of the SFN through the scrambling sequence during the PBCH decoding. The terminal may finally identify 10 bits (B9~B0) of the SFN by combining two bits (B1~B0) obtained through the scrambling sequence and 8 bits (B9~B2) obtained explicitly through the PBCH.

The evolved mobile networks after the LTE should meet technical requirements to support a wider range of service scenarios, as well as the high transmission speeds that were previously a major concern. Recently, the ITU-R has defined key performance indicators (KPIs) and requirements for the IMT-2020, the official name for 5G mobile communications. These are summarized as enhanced mobile broadband (eMBB), ultra reliable low latency communication (URLLC), and massive machine type communication (mMTC). The planned schedule of the ITU-R aims to distribute frequencies for the IMT-2020 in year 2019 and complete international standard approval by year 2020.

The 3GPP is developing 5G standard specifications based on a new radio access technology (RAT) that meets the requirements of IMT-2020. According to the definition of 3GPP, the new radio access technology is a radio access technology that does not have backward compatibility with the existing 3GPP radio access technology. The new wireless communication system after the LTE adopting such the radio access technology will be referred to herein as a new radio (NR).

As waveform technologies for the NR, candidates such as orthogonal frequency division multiplexing (OFDM), filtered OFDM, generalized frequency division multiplexing (GFDM), filter bank multi-carrier (FBMC), and universal filtered multi-carrier (UFMC) are being discussed. Although there are advantages and disadvantages, cyclic prefix (CP) based OFDM and single carrier-frequency division multiple access (SC-FDMA) are still effective schemes for 5G systems due to the relatively low implementation complexity and multiple-input multiple-output (MIMO) scalability. However, in order to flexibly support various 5G usage scenarios, a method of simultaneously accommodating various waveform parameters in one carrier without guard bands may be considered. To this end, the filtered OFDM, the GFDM, or the like having a frequency spectrum with low out of band emission (OOB) may be suitable.

In the present invention, for convenience of description, it is assumed that the CP-based OFDM (CP-OFDM) is a waveform technology for wireless access. However, this is merely for convenience of description, and the scope of the claims of the present invention is not limited to a specific waveform technology. In general, the category of CP-based OFDM technology includes the filtered OFDM or the spread spectrum OFDM (e.g., DFT-spread OFDM) technology.

One of the biggest factors determining a subcarrier spacing of an OFDM system is a carrier frequency offset (CFO) experienced by a receiver, which is characterized by an increase in proportion to an operating frequency due to a Doppler effect and a phase drift. Therefore, in order to prevent performance degradation due to the carrier frequency offset, the subcarrier spacing should increase in proportion to the operating frequency. On the other hand, if the subcarrier spacing is too large, there is a disadvantage that the CP overhead increases. Therefore, the subcarrier spacing should be defined as an appropriate value considering channel and RF characteristics for each frequency band.

Various numerologies are considered in the NR system. For example, the subcarrier spacing of 15 kHz, which is the subcarrier spacing of the conventional LTE, and the subcarrier spacings of 30 kHz, 60 kHz, and 120 kHz, which respectively are 2, 4, and 8 times scaled, may be considered together. Configuring the differences between the subcarrier spacings of different numerologies by exponential multipliers of 2 may be advantageous for heterogeneous numerology-based carrier aggregation, frame structure design, and multiplexing of heterogeneous numerology within one carrier.

The NR system is expected to be used in a wide range of frequencies ranging from hundreds of MHz to tens of GHz. In general, since the diffraction and reflection characteristics of radio waves are not good at high frequencies, propagation characteristics are generally not good, and propagation losses such as path loss and reflection loss are known to be relatively large compared to those of the low frequencies. Therefore, when the NR system is deployed in the high frequency, cell coverage may be reduced as compared with the existing low frequency. In order to solve this problem, a method of increasing cell coverage through beamforming using a plurality of antenna elements may be considered at high frequency.

The beamforming schemes may include an analog beamforming scheme and a digital beamforming scheme. The digital beamforming scheme may obtain a beamforming gain by using a plurality of radio frequency (RF) paths based on multiple input multiple output (MIMO) and a digital precoder or a codebook. The analog beamforming scheme may obtain a beamforming gain through an antenna array and a number of analog and RF devices such as phase shifters, power amplifiers (PAs), and variable gain amplifiers (VGAs). Since the digital beamforming scheme requires a digital-to-analog converter (DAC) or an analog-to-digital converter (ADC) and requires the same number of transceiver units (TXRUs) as antenna elements, increase of the beamforming gain proportionally increases the complexity of the antenna implementation as well. In the analog beamforming scheme, since a plurality of antenna elements are connected to a single transceiver unit through phase shifters, even when the number of antenna elements is increased in order to increase the beamforming gain, the resulting complexity is not greatly increased. However, the performance of the analog beamforming scheme is lower than that of the digital beamforming scheme, and the frequency resource utilization efficiency is limited because the phase shifters are controlled in time domain. Therefore, a hybrid beamforming scheme, which is a combination of the analog scheme and the digital scheme, may be used.

In the case that the cell coverage is increased through the beamforming, not only dedicated control channels and dedicated data for each terminal in the cell but also common control channels and common signals for all terminals in the cell may be also transmitted in the beamforming manner. When the common control channels and signals are transmitted to all terminals by applying the beamforming to increase the cell coverage, since the common control channels and signals cannot be transmitted to all the regions in the cell through a single transmission, they may be transmitted through a plurality of beams over a plurality of times for a predetermined time. Transmitting multiple times by switching multiple beams is called beam sweeping. Such the beam sweeping operation is necessarily required when transmitting common control channels and signals using the beamforming.

A terminal accessing the system acquires downlink frequency/time synchronization and a cell ID through a synchronization signal (SS), acquires uplink synchronization through a random access procedure, and establishes a link. In this case, in the NR system, TDM-based multiplexing of an NR-SS and an NR-PBCH which are periodically transmitted is supported, and they are transmitted using N(=4) OFDM symbols. These N OFDM symbols are defined as an SS block (SSB). In case of transmitting the SSBs using beamforming, a beam sweeping operation that transmits multiple beams while switching the multiple beams is required. For this, a plurality of SSBs may be defined within a transmission period of the NR-SS and the NR-PBCH, and the plurality of SSBs configured as described above are assembled into an SS burst set.

Figure 3:
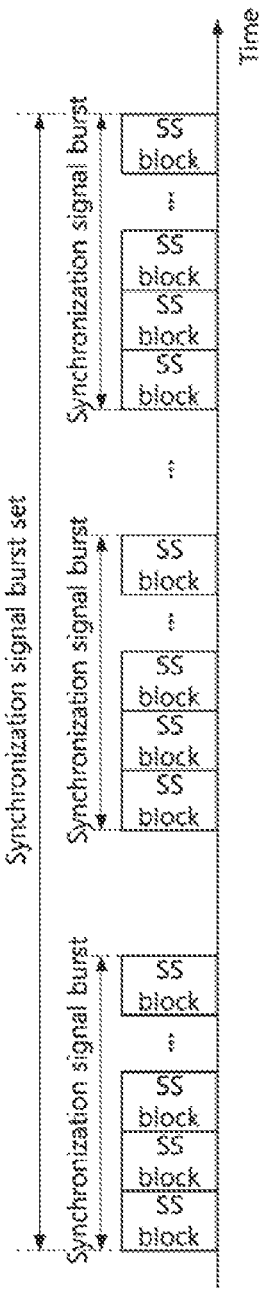
FIG. 3 is a conceptual diagram for describing transmission of an SS burst set in an NR system.

FIG. 3 is a conceptual diagram for describing transmission of an SS burst set in an NR system.

Referring to FIG. 3, an SS burst set is repeated periodically. According to a periodicity of the SS burst set, the base station transmits SSBs to the terminals in the cell through different beams in a beam sweeping manner. The maximum number L of SSBs constituting one SS burst set and the locations of the L SSBs are defined in the specification, and L may have a different value according to a system frequency region. The number and locations of SSBs actually transmitted among the L SSBs may be determined by a network.

Figure 4:
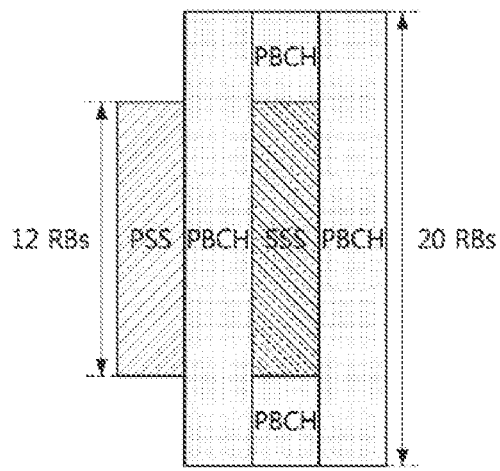
FIG. 4 is a conceptual diagram for describing a synchronization signal block configuration of an NR system.

FIG. 4 is a conceptual diagram for describing a synchronization signal block configuration of an NR system.

Referring to FIG. 4, signals and a channel are time division multiplexed in one SSB in the order of PSS, PBCH, SSS, and PBCH, and the PBCH may be transmitted in both end bands adjacent to the frequency band in which the SSS is transmitted. Also, an SSB index may be identified through a PBCH DMRS when the maximum number L of SSBs is 8 in the sub 6 GHz frequency band. When the maximum number L of SSBs is 64 in the over 6 GHz frequency band. LSB 3 bits of 6 bits representing the SSB index is identified through the PBCH DMRS, and the remaining MSB 3 bits are transmitted through a payload of the PBCH, which are identified by performing decoding on the PBCH.

The NR system can support a system bandwidth of up to 400 MHz, but in case of a terminal, the size of bandwidth that can be supported may vary according to the capability of the terminal. Therefore, some terminals accessing the wideband system can access only part of the entire band of the system. In order to facilitate connection of terminals supporting various bandwidths in a system supporting such a wide bandwidth, unlike the conventional LTE, which always transmits synchronization signals and PBCHs at the center of the system bandwidth, the NR system may transmit SSBs in multiple locations in the frequency axis.

Figure 5:
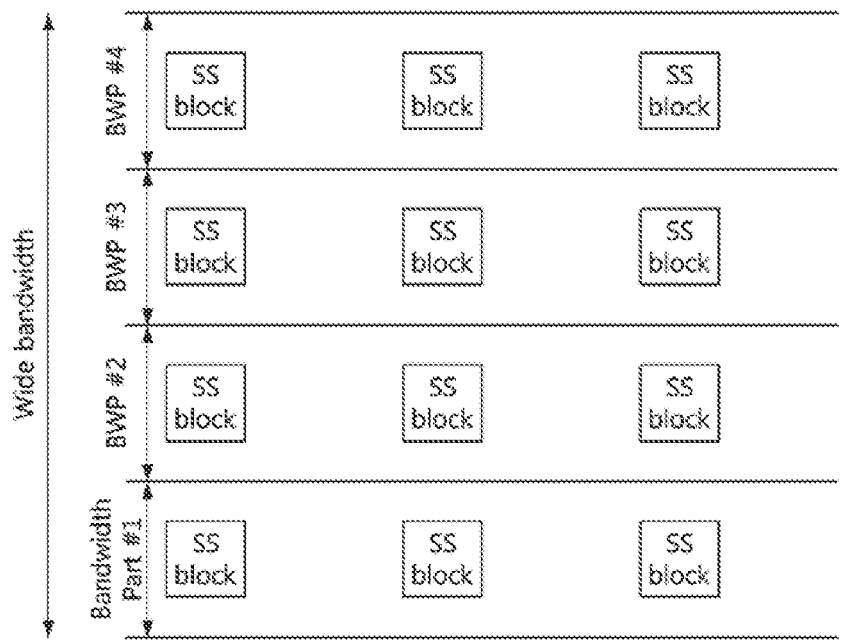
FIG. 5 is a conceptual diagram for describing an example of dividing a wideband component carrier (CC) into a plurality of bandwidth parts (BWP) and transmitting SSBs in each BWP in an NR system.

FIG. 5 is a conceptual diagram for describing an example of dividing a wideband component carrier (CC) into a plurality of bandwidth parts (BWP) and transmitting SSBs in each BWP in an NR system.

Referring to FIG. 5, a terminal may perform initial access using one of SSBs transmitted through each BWP. After detecting of an SSB, the terminal may perform a cell access procedure by acquiring Remaining Minimum System Information (RMSI), and the RMSI may be transmitted in a PDSCH through scheduling by a PDCCH. In this case, configuration information of a Control Resource Set (CORESET) in which the PDCCH containing scheduling information of a RMSI PDSCH is transmitted is transmitted through a PBCH in the SSB. When multiple SSBs are transmitted in the entire system band, some SSBs may have RMSIs associated therewith, and some SSBs may not have RMSIs associated therewith. In this case, the SSB having the associated RMSI is defined as a 'cell defining SSB', and the cell search and initial access procedure of the terminal may be performed only through the 'cell defining SSB'. The SSBs not having the associated RMSI may be used for performing synchronization or measurement in the corresponding BWP. In this case, the BWP in which the SSB is transmitted may be limited to some of several BWPs in the wideband.

As described above, the reception of RMSI is performed through a series of processes of detecting a PDCCH through the CORESET configuration information transmitted through a PBCH, obtaining scheduling information of an RMSI from the PDCCH, and receiving a PDSCH accordingly. In this case, a control channel resource region through which the PDCCH can be transmitted is configured through RMSI CORESET configuration information, which may have three patterns as follows.

Figure 6:
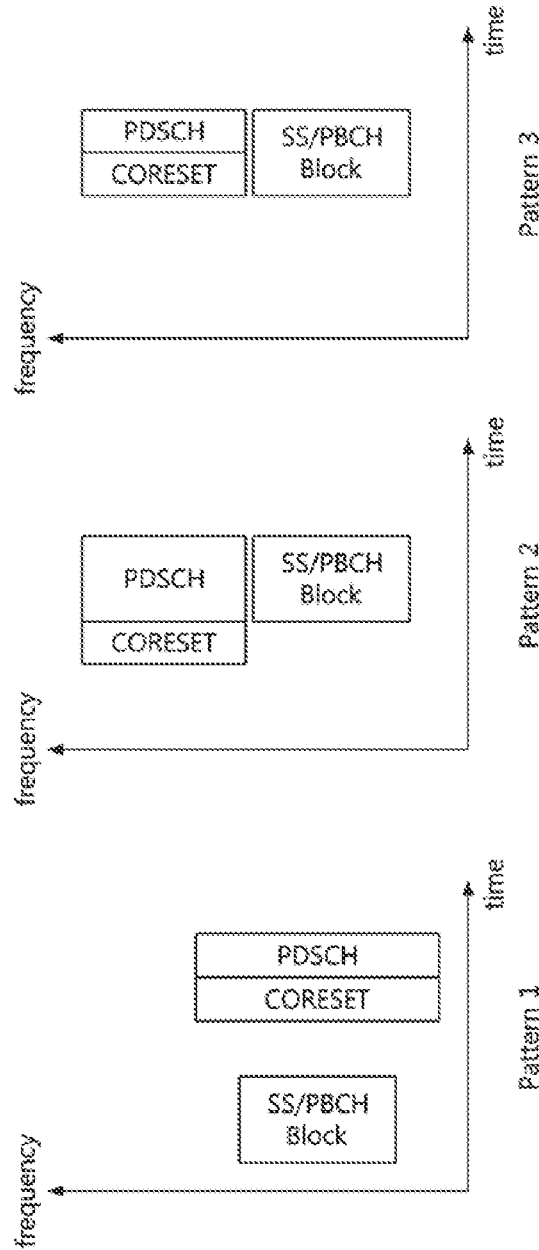
FIG. 6 is a conceptual diagram for describing three basic patterns for configuring an RMSI CORESET in an NR system.

FIG. 6 is a conceptual diagram for describing three basic patterns for configuring an RMSI CORESET in an NR system.

In order to configure an RMSI CORESET, one of three patterns shown in FIG. 6 is selected, and detailed configuration is completed in the selected pattern. In the pattern 1, SSB, RMSI CORESET, and RMSI PDSCH are all TDMed. In the pattern 2, RMSI CORESET and RMSI PDSCH are TDMed, and only RMSI PDSCH is frequency division multiplexed (FDMed) with SSB. In the pattern 3, RMSI CORESET and RMSI PDSCH are TDMed, and both RMSI CORESET and RMSI PDSCH are FDMed with SSB. Only the pattern 1 can be used in the frequency band below 6 GHz, and the patterns 1, 2, and 3 can be used in the frequency band above 6 GHz. Also, the numerologies used for SSB. RMSI CORESET, and RMSI PDSCH may differ. For the pattern 1, all combinations of numerologies can be used. For the pattern 2, only combinations of {SSB, RMSI}, which include {120 kHz, 60 kHz} and {240 kHz, 120 kHz}, can be used. For the pattern 3, only a combination of (SSB, RMSI), which is {120 kHz, 120 kHz}, can be used.

The RMSI CORESET configuration information selects one of the three patterns according to a combination of numerologies for SSB and RMSI. The RMSI CORESET configuration information may be configured using Table A representing the number of resource blocks (RBs) of the RMSI CORESET, the number of symbols of the CORESET, and information on an offset between an RB of the SSB and an RB of the RMSI CORESET, and Table B representing the number of search space sets per slot for each pattern and information for configuring a monitoring occasion of RMSI PDCCH such as a CORESET offset, an OFDM symbol index, and the like. Each of Tables A and B actually consists of several tables (Table A: Table 13-1 to Table 13-8, Table B: Table 13-9 to Table 13-13). The RMSI CORESET configuration information is configured with 4 bits from each of Tables A and B. and represents information of 8 bits.

In the NR system, a PDSCH may be transmitted using one of two time domain mapping types. The two mapping types are Type A and Type B, and are defined as Table 1 below.

operations in an unlicensed spectrum used in communication systems such as Wi-Fi to increase network capacity by increasing utilization of limited frequency resources. The 3GPP communication system for operations in an unlicensed band has begun standardization with Licensed-Assisted Access (LTE-LAA) technology in 3GPP release 13, and has continued to evolve to release 14 'Enhanced LAA (LTE-eLAA)' and release 15 'Further Enhanced LAA (LTE-FeLAA)'. Also in the NR, a standardization work is proceeding through a work item (WI) in the release 16 started from a study item (SI) for the NR-U.

In the NR-U, similarly to the general NR system, terminals can determine whether a base station (e.g., gNB) transmits a signal based on a discovery reference signal (DRS) transmitted from the base station. In particular, in the NR-U of a stand-alone (SA) mode, the terminal may acquire synchronization and system information through the DRS. In the NR-U system, the transmission of the DRS should comply with the regulation for the use of the unlicensed band (e.g., transmission band and transmission power, and transmission time). In particular, when a signal is transmitted in the unlicensed band, the transmission signal should be configured and transmitted to occupy 80% of the total channel bandwidth (e.g., 20 MHz) according to the occupied channel bandwidth (OCB) regulation.

In addition, in the case of the NR-U, a Listen-Before-Talk (LBT) procedure should be performed for coexistence with other systems due to the characteristics of the unlicensed band in order to transmit a signal and data as well as the DRS. The LBT procedure is a procedure for identifying whether another base station, another terminal, or another system is transmitting a signal before transmitting a signal. The base station or terminal of the NR-U system may determine whether a signal is transmitted or not for a predetermined time period through the LBT procedure, and

TABLE 1

| PDSCH mapping type | Normal CP | | | Extended CP | | |
| --- | --- | --- | --- | --- | --- | --- |
| | S | L | S + L | S | L | S + L |
| Type A | {0, 1, 2, 3} (Note 1) | {3, ..., 14} | {3, ..., 14} | {0, 1, 2, 3} (Note 1) | {3, ..., 12} | {3, ..., 12} |
| Type B | {0, ..., 12} | {2, 4, 7} | {2, ..., 14} | {0, ..., 10} | {2, 4, 6} | {2, ..., 12} |

Note 1:
S = 3 is applicable only if dmrs-TypeA-Position = 3

The type A is a slot-based transmission, and the position of the symbol where a PDSCH starts may be set to one of {0, 1, 2, 3}. The number of symbols where the PDSCH is transmitted may be set to one of 3 to 14 within a range not exceeding a slot boundary in case of a normal CP. The type B is a non-slot-based transmission, and the position of the symbols where the PDSCH starts may be set to one of 0 to 12. The number of symbols where the PDSCH is transmitted may be set to one of {2, 4, 7} within a range not exceeding a slot boundary in case of a normal CP. In this case, a DM-RS for data demodulation of the PDSCH is determined by a value of ld indicating the type A and the type B resource allocation scheme and a length, and the value of ld may be defined differently according to the type A and type B resource allocation scheme.

As NR phase 1 standardization has been finalized in 3GPP release 15 and phase 2 standardization is proceeding in release 16, new features for the NR system are being discussed. The representative one among them is NR-Unlicensed (NR-U). The NR-U is a technology to support may transmit its own signal when it is determined that no signal is transmitted. When the LBT procedure fails, the base station or terminal may not transmit a signal. Depending on the type of signal to be transmitted, various categories of LBT procedures may be performed before transmission of the corresponding signal.

Also, as the standardization phase 2 has been started in Release-16, new features of the NR system are being discussed. One of the representative functions under discussion is NR vehicular-to-everything (V2X) communication. The V2X is a technology that supports communications in various scenarios such as between vehicles, between a vehicle and an infrastructure, and between a vehicle and a pedestrian based on device-to-device (D2D) communications of the long term evolution (LTE) system, and is also continuing to develop. The NR V2X is also being discussed in the NR with the start of Release 16.

Three types of data transmission schemes are being discussed in the NR V2X. They are a unicast scheme for transmitting data to a specific terminal, a broadcast scheme for transmitting the same data to all terminals, and a groupcast scheme for transmitting data to a group consisting of a plurality of terminals. In the case of unicast data transmission, a specific terminal receives data transmitted to itself, and transmits acknowledgement (ACK) or negative acknowledgment (NACK) feedback according to whether the data has been normally received or not. When confirming that the ACK is transmitted as a result of identifying the ACK/NACK feedback, a transmitting terminal may determine that the specific terminal has successfully received the data. On the other hand, when it is confirmed that the NACK is transmitted, the transmitting terminal may determine that the specific terminal has failed to receive the data, and may transmit additional information according to a HARQ scheme or retransmit the same data to increase the probability of receiving the data at the specific terminal. In the case of broadcast scheme of transmitting the same data to all terminals, since it is difficult to receive ACK/NACK feedbacks from all the terminals, and it is difficult to determine whether the data has been normally received at each of all the terminals, the ACK/NACK feedback procedure is not usually applied. In case of system information, which is representative information transmitted in the broadcast scheme, the ACK/NCAK feedback procedure is not applied. Therefore, the system information is periodically broadcast to solve the problem that it cannot be determined whether the data has been normally received at each of all the terminals. In the case of the groupcast scheme newly discussed in the NR V2X, since information is transmitted to a plurality of terminals, it is possible to periodically transmit necessary information without the ACK/NACK feedback procedure as in the broadcast scheme. However, unlike the broadcast scheme, when the number of target receiving terminals are limited and the type of data is a type of data that should be received within a predetermined time, efficient and stable data transmission and reception can be enabled by applying the ACK/NACK feedback procedure similarly to the unicast scheme.

In addition, in case of power control for sidelink, a transmission power of the transmitting terminal may be appropriately adjusted according to a transmission environment, thereby increasing data reliability at the receiving terminal, and mitigating interferences to other terminals. It also increases energy efficiency by reducing unnecessary transmission power usage. In the case of power control, there are an open-loop power control scheme, in which the transmission power is set with a value determined by a transmitting side in consideration of a given configuration and a measured environment, and a closed-loop power control scheme, in which the transmitting side adjusts a previously set power value by receiving a transmit power control (TPC) command from a receiving side of data.

It may be difficult due to various causes including a multipath fading channel, interference, and the like to predict a received signal strength at the receiving terminal. Accordingly, the receiving terminal may adjust a receive power level (e.g., receive power range) by performing an automatic gain control (AGC) operation to prevent a quantization error of the received signal and maintain a proper receive power. In the communication system, the terminal may perform the AGC operation using a reference signal received from the base station. However, in the sidelink communication (e.g., V2X communication), the reference signal may not be transmitted from the base station. That is, in the sidelink communication, communication between terminals may be performed without the base station. Therefore, it may be difficult to perform the AGC operation in the sidelink communication. In the sidelink communication, the transmitting terminal may first transmit a signal (e.g., reference signal) to the receiving terminal before transmitting data, and the receiving terminal may adjust a receive power range (e.g., receive power level) by performing an AGC operation based on the signal received from the transmitting terminal. Thereafter, the transmitting terminal may transmit sidelink data to the receiving terminal. The signal used for the AGC operation may be a signal duplicated from a signal to be transmitted later or a signal preconfigured between the terminals.

In the NR-V2X communication, retransmission may be performed by a predetermined number of times according to a predetermined procedure regardless of whether or not reception is successful in order to increase reception reliability of a data transmission/reception procedure through a sidelink. In this case, there is no need to transmit a feedback according to whether reception is successful. Alternatively, a receiving terminal may transmit a feedback according to whether reception is successful, and a transmitting terminal may perform retransmission accordingly. When a receiving terminal transmits a feedback according to whether reception is successful or not and a transmitting terminal performs retransmission accordingly, the receiving terminal should transmit acknowledgment (ACK) or negative ACK (NACK) feedback information to the transmitting terminal according to whether data has been successfully received. On the other hand, the transmitting terminal should monitor the feedback information from the receiving terminal to determine whether to retransmit the data. In general, such the transmission and monitoring of the feedback information may be performed in a point-to-point scheme at the receiving side and the transmitting side of data. However, in case of the sidelink communication, which is communication between terminals, since a transmitting terminal can autonomously select a resource and a receiving terminal without control of the base station, a transmission time and a reception time of feedback information for a specific terminal may overlap. In addition, one terminal may simultaneously transmit feedback information to multiple terminals, and one terminal may simultaneously transmit feedback information for multiple data units received from another terminal.

For sidelink communication in the NR-V2X, transmission of a data channel for actual data transmission and transmission of a control channel including scheduling information for resource allocation of the data channel are required. In the sidelink communication, a physical sidelink shared channel (PSSCH) may be used as a data channel, and a physical sidelink control channel (PSCCH) may be used as a control channel. The data channel and the control channel may be multiplexed and transmitted in the time and frequency resource domain. In the NR-V2X standardization, various multiplexing schemes have been discussed, and the option 3, which will be described later, may be basically supported.

Channel Multiplexing for Sidelink Communication

Figure 7:
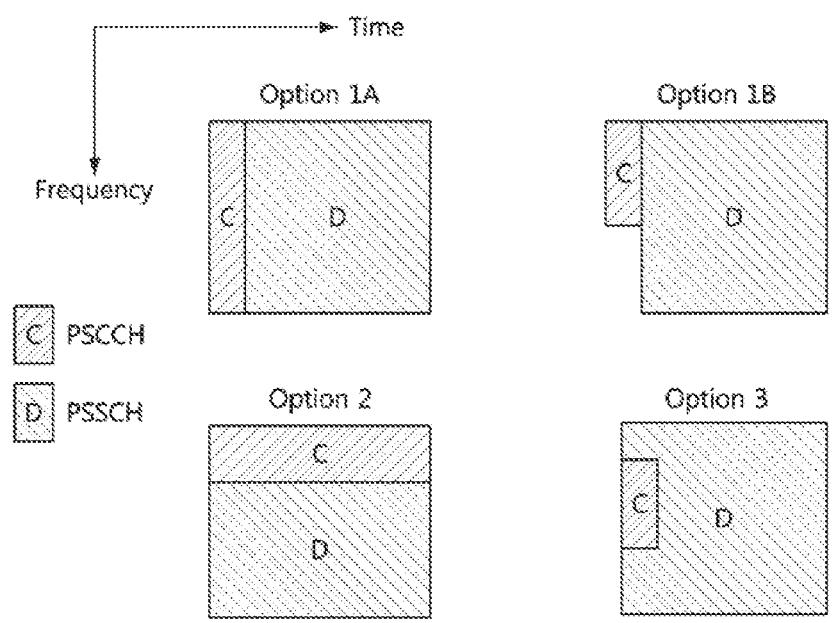
FIG. 7 is a conceptual diagram for describing channel multiplexing in a sidelink communication system.

FIG. 7 is a conceptual diagram for describing channel multiplexing in a sidelink communication system.

As shown in FIG. 7, the multiplexing schemes of a PSCCH that is a sidelink control channel and a PSSCH that is a sidelink data channel may be classified into an option 1A/B in which the PSCCH and the PSSCH are time division multiplexed (TDMed), an option 2 in which the PSCCH and the PSSCH are frequency division multiplexed (FDMed), and an option 3 in which the PSCCH and the PSSCH are time/frequency multiplexed.

Referring to FIG. 7, in the NR-V2X sidelink communication, a sub-channel may be used as a basic unit of resource configuration. The sub-channel may be defined as a predetermined time and frequency resource, and may be composed of a plurality of OFDM symbols and a plurality of resource blocks (RBs) in the time and frequency domain. In general, a data channel and a control channel within the sub-channel may be multiplexed in the option 3 scheme of FIG. 7.

When a plurality of sub-channels are allocated for data communication to a specific terminal, a data channel and a control channel may be multiplexed in all sub-channels allocated to the terminal or multiplexed only in a specific sub-channel. When the data channel and the control channel are multiplexed in all sub-channels, it may be advantageous to secure resources for transmission of control channels. However, when there is no prior information on how many sub-channels are allocated to the terminal, complexity may be increased because blind detection of a plurality of sub-channels should be performed. Further, even when a plurality of sub-channels need to be allocated according to the size of the data to be transmitted, the size of control information required to transmit the data may not be increased in proportion to the size of the data, and in general, it may be maintained constantly.

Accordingly, in an exemplary embodiment of the present disclosure, even when a plurality of sub-channels are allocated for data transmission to a specific terminal, the data channel and the control channel may always be multiplexed only in a specific sub-channel(s). That is, the control channel transmitted to the corresponding terminal may always be transmitted as limited to a specific sub-channel(s). More specifically, the specific sub-channel(s) may be sub-channel (s) having the smallest index, the largest index, or a statically determined index among the sub-channels allocated to the corresponding terminal. For example, when sub-channels #n, #n+1, #n+2, and #n+3 are allocated to a specific terminal, if the control channel is transmitted only through the sub-channel(s) having the smallest index, the control channel may be transmitted only in the sub-channel #n as multiplexed with the data channel, and only the data channel may be transmitted in the remaining sub-channels #n+1, #n+2, and #n+3. When the control channel is transmitted through only one sub-channel, if a channel state of a resource region that is limitedly used for transmission of the control channel in the corresponding sub-channel is not good, or the resource for transmitting the control channel carrying important control information is insufficient within the sub-channel, the control channel may be transmitted as extended to the next sub-channel region. Specifically, when the sub-channels #n, #n+1, #n+2, and #n+3 are allocated to a specific terminal, if the control channel is transmitted only through the sub-channel #n, and the limited resource region for the control channel within the sub-channel #n is insufficient, the control channel may be transmitted also in the region of the sub-channel #n+1. As described above, when the resource region for transmitting the control channel is insufficient, the control channel may be allocated to additional resources secured while increasing the sub-channel index. On the other hand, when the sub-channel of the largest index is first allocated for transmission of the control channel among the sub-channels allocated to a specific terminal, if the resource region of the corresponding sub-channel is insufficient, the control channel may be allocated to additional resources secured while reducing the sub-channel index.

Figure 8A:
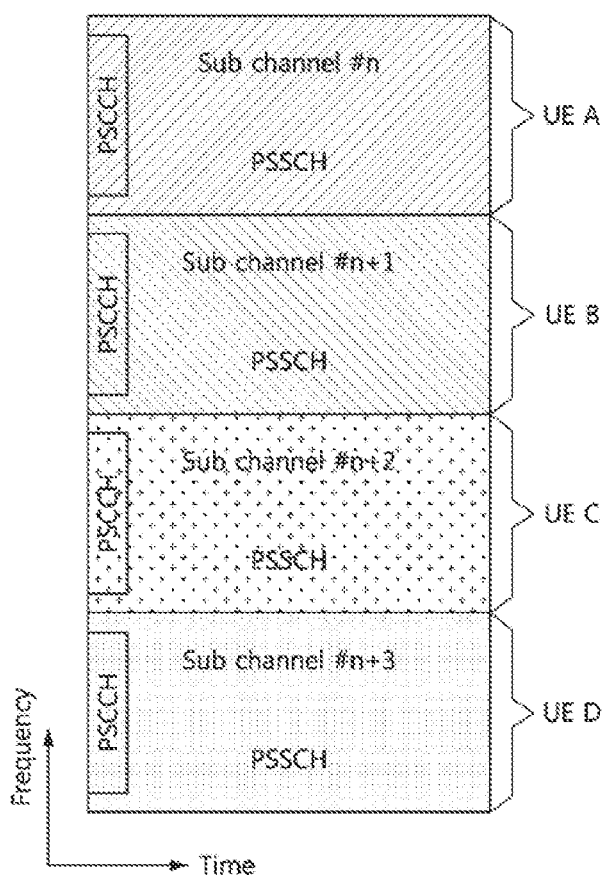
FIGS. 8A and 8B are conceptual diagrams for describing a first exemplary embodiment of channel multiplexing in a communication system according to the present disclosure.
Figure 8B:
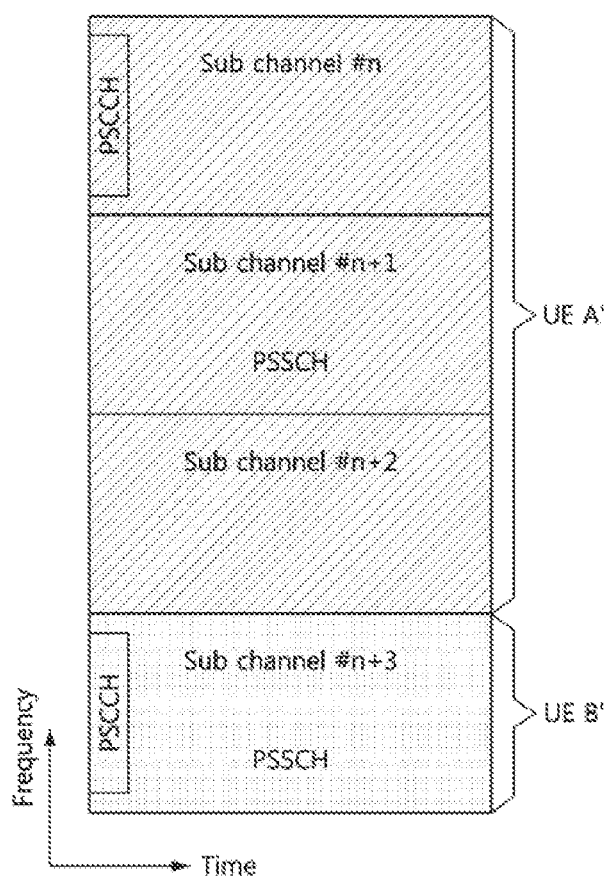

FIGS. 8A and 8B are conceptual diagrams for describing a first exemplary embodiment of channel multiplexing in a communication system according to the present disclosure.

Referring to FIG. 8A, illustrated is a case in which one sub-channel, which is a basic unit of data transmission, is allocated to each of terminals (e.g., UE A, UE B, UE C, and UE D). The data channel and the control channel of each terminal may be multiplexed within the sub-channel in the same manner as the option 3 of FIG. 7 described above.

Referring to FIG. 8B, illustrated is a case in which a plurality of sub-channels #n, #n+1, and #n+2 are allocated to a specific terminal (e.g., UE A'), and one sub-channel #n+3 is allocated to another terminal (e.g., UE B'). In case of the specific terminal (i.e., UE A'), the control channel is not multiplexed with the data channel in all sub-channels, and is multiplexed with the data channel only in a sub-channel (e.g., sub-channel #n) having the smallest index among the sub-channels allocated to the terminal. Other sub-channels may be used only for transmission of data channel(s).

In case of the NR system, a basic unit of a resource for transmitting a control channel is a control channel element (CCE), and one CCE may be composed of 6 resource element groups (REGs). One REG may consist of 1 physical resource block (PRB, 12 subcarriers) in the frequency domain and 1 OFDM symbol in the time domain. The control channel may be transmitted by applying one of CCE aggregation levels 1, 2, 4, 8, and 16 according to a code rate, etc. applied in consideration of the size of control information to be transmitted and the channel state. Also in the NR-V2X sidelink communication, a control channel may be transmitted in the same manner, and a design of a sidelink control channel (i.e., PSCCH) considering the size and structure of the sub-channel that is a basic unit of sidelink communication is required. Accordingly, exemplary embodiments of the present disclosure propose a PSCCH resource mapping method considering the size and structure of the sub-channel.

The basic unit of resource allocation in the NR-V2X sidelink communication is a slot in the time domain and 10, 15, 20, 25, 50, 75, or 100 PRBs in the frequency domain (other values may be added). Also, a PSCCH within a sub-channel may be transmitted through 2 or 3 OFDM symbols. Currently, the NR-V2X system supports at least the option 3 scheme of FIG. 7 as the PSCCH and PSSCH multiplexing scheme. Therefore, an appropriate PSCCH resource mapping method considering a frequency-axis size of a sub-channel, a time duration of the PSCCH, and the multiplexing scheme of the PSCCH and PSSCH is needed.

In an exemplary embodiment, a frequency start position may be determined so that one or a plurality of CCEs can be mapped in the sub-channel in consideration of the frequency-axis size of the sub-channel and the number of OFDM symbols for PSCCH transmission in the sub-channel. First, CCEs may be defined in units of 6 PRBs in the time and frequency domain from a first PRB within the sub-channel. In this case, resources remaining in the frequency domain may not be used as CCEs, but may be used for data transmission, or may be left empty. For example, w % ben the frequency-axis size of one sub-channel is determined as 10 PRBs and the PSCCH is transmitted through 2 OFDM symbols, 6 PRBs may constitute one CCE in units of 3 PRBs in the frequency domain and in units of 2 OFDM symbols in the time domain from the first PRB as a start point. As described above, when configuring the CCE in units of 3 PRBs in the frequency domain, a total of 9 PRBs constitute the CCEs, and the remaining 1 PRB in the sub-channel may not be used as a CCE and may be used for data transmission or left empty. According to the various frequency-axis sizes of the sub-channel, CCEs may be configured in units of 6 PRBs in the time and frequency domains based on the first PRB within the sub-channel, the remaining PRBs that do not constitute the CCE within the sub-channel may be used for data transmission or left empty. Through this, the terminal may implicitly find out the configuration of CCEs based on the preconfigured frequency-axis size of the sub-channel, thereby obtaining information of control channel. Alternatively, a method of configuring CCEs by using the last PRB as a start point may also be applied instead of the first PRB.

Since the control information includes scheduling information of data and retransmission of the control information is difficult as compared to data information, the control channel may be usually transmitted with a higher transmission power than the data channel. In addition, in the sidelink communication, since the control channel is monitored by all terminals, it is usually transmitted with a higher transmission power than the data channel. In this case, if the configuration of the CCEs for transmission of the control channel starts from the first PRB or the last PRB, the control channel may be necessarily mapped to one side of the sidelink frequency axis. In general, due to the characteristics of the control channel transmitted with a higher transmission power than the data channel, interferences on adjacent sub-channels due to in-band emission (IBE) may be greater than that of the data channel.

Accordingly, in an exemplary embodiment, CCEs used for transmission of the control channel may start at a position obtained by applying a predetermined offset to the first PRB instead of a position of the first PRB of the sub-channel. The corresponding start position may be implicitly determined according to the sub-channel size. More specifically, at least one PRB(s) may be given as an offset (i.e., frequency-axis offset) in at least one of both ending frequencies of the sub-channel, and then CCEs may be configured in units of 6 PRBs in the time and frequency domains. In this case, the frequency-axis offset may be implicitly determined according to the frequency-axis size of the sub-channel and the number of OFDM symbols used for PSCCH transmission. More specifically, the frequency-axis offset applied to CCEs may be implicitly determined through the following procedure.
1. Determine the size X of PRBs in the frequency domain constituting the CCE according to the number of OFDM symbols used for PSCCH transmission.
   A. When two OFDM symbols are used, X=3; When 3 OFDM symbols are used, X=2.
2. Determine the number of N's satisfying N*X<M by considering the frequency-size M of the sub-channel.
3. Calculate R=floor ((M−N*X)/2).
   A. When R=0, N is decreased by 1, and substituted into the equation of the step 2.
   B. When R>0, set the frequency-axis offset value for the start position of CCEs within the sub-channel to R.

Figure 9:
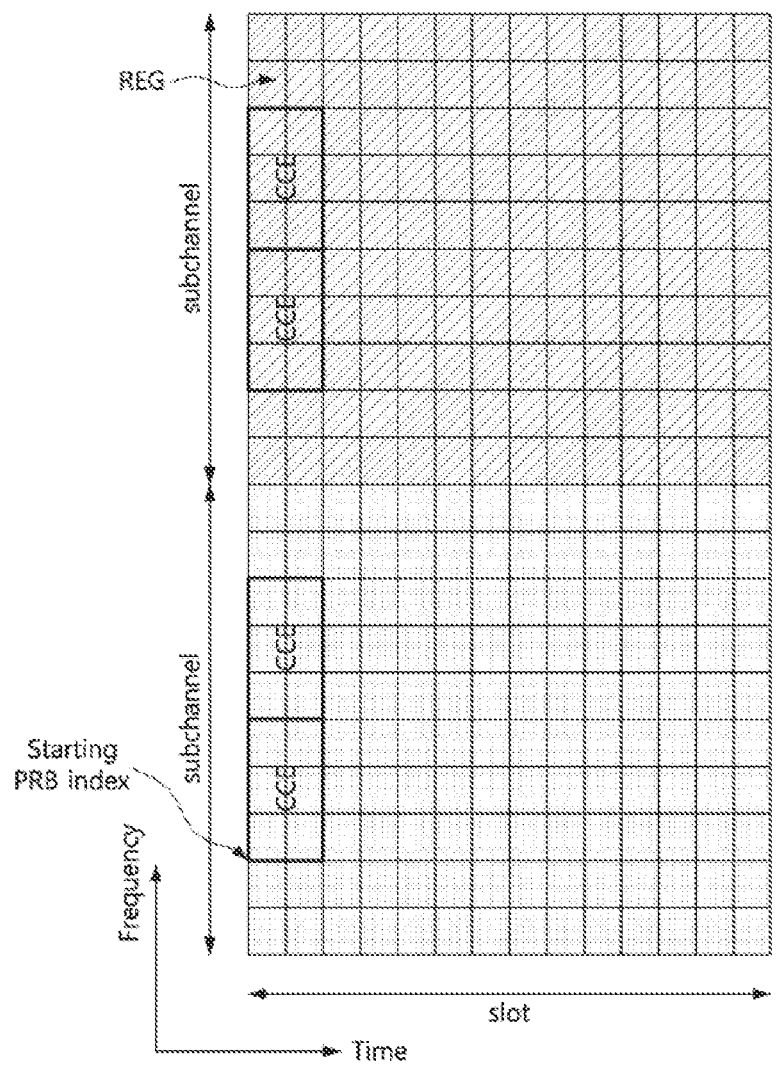
FIG. 9 is a conceptual diagram for describing a second exemplary embodiment of channel multiplexing in a communication system according to the present disclosure.

FIG. 9 is a conceptual diagram for describing a second exemplary embodiment of channel multiplexing in a communication system according to the present disclosure.

Referring to FIG. 9, the frequency-axis size of the sub-channel may be configured to be 10 PRBs, and the number of OFDM symbols for PSCCH transmission may be configured to be 3. In this case, one CCE may consist of 2 PRBs in the frequency domain and 3 OFDM symbols in the time domain. Therefore, N=2 and R=2 may be obtained as a result of calculation by applying the corresponding values (i.e., M=10, X=3) to the above procedure. Accordingly, the frequency-axis start position for CCE configuration may be configured from a position having an offset of 2 PRBs, and 2 CCEs may be configured within one sub-channel. In this case, there may be an offset of 2 PRBs also on the opposite side of the CCE start position within the sub-channel. Since 4 PRBs remain in the frequency domain, there may be resources in which one CCE may be further configured. However, when one CCE is further configured in the remaining 4 PRBs, a control channel exists at one end of the sub-channel, which may adversely affect IBE mitigation. Therefore, in order to have PRB offsets for the IBE mitigation at both ends of the frequency of the sub-channel, it may be preferable to configure the resources as shown in FIG. 9.

In another exemplary embodiment, 1 PRB offset may be always applied without calculating the PRB offset for the CCE start position through the above-described procedure. In this case, since the same offset is always applied regardless of the frequency-size of the sub-channel, a separate calculation procedure is not necessary. However, in case of configuring CCEs with 1 PRB offset, even when the frequency resources required for CCE configuration remain in the frequency domain, if the additional configuration of the corresponding CCEs makes the PRB offset for IBE mitigation not exist, the corresponding CCE may not be configured. For example, in the case of FIG. 9, if the CCE is configured with 1 PRB offset, 3 PRBs may be left upward, and additional CCE configuration may be possible. However, when the additional CCE is configured, since there is no offset in one side of the sub-channel, the IBE problem due to the control channel transmission may occur. Therefore, in this case, it may be preferable not to configure the corresponding CCE.

On the other hand, when a plurality of sub-channels are allocated to one terminal, only CCEs configured within one sub-channel may be insufficient for PSCCH transmission. In this case, CCEs in a sub-channel added while increasing the index of the sub-channel may be used for PSCCH transmission. In this case, the frequency-axis offset may be calculated again in consideration of the size of all the allocated sub-channels, and CCEs may be configured without a boundary separation between the sub-channels. Alternatively, even when a plurality of sub-channels are allocated, CCEs may be configured in the same manner within each sub-channel, and CCEs used for actual PSCCH transmission may be mapped in consideration of the entire plurality of sub-channels.

A method proposed in the present disclosure is for CCE configuration for control channel transmission, and the actual PSCCH may be mapped to an arbitrary location in the configured CCEs. Not all CCEs are used for the PSCCH transmission, and some unused CCEs may exist.

In the NR-V2X sidelink communication, a plurality of sub-channels may be allocated to a specific terminal within a specific time unit (e.g., hereinafter, a slot for convenience), but a plurality of time units (hereinafter, multiple slots for convenience) may also be allocated. When a plurality of slots are allocated for data transmission of a specific terminal, the corresponding terminal should perform blind detection on the plurality of slots to identify whether a control channel is transmitted. In this case, the complexity of the terminal may increase.

Accordingly, in an exemplary embodiment, when a plurality of slots are allocated for data transmission to a specific terminal, a control channel may be transmitted only within a specific slot among the plurality of allocated slots. More specifically, the specific slot may be a slot having the smallest index, the largest index, or a statically-determined index among the plurality of slots allocated to the corresponding terminal. When a plurality of sub-channels and a plurality of slots are simultaneously allocated to a specific terminal, a transmission position of a control channel within a corresponding resource region may be limited to a specific sub-channel index and a specific slot index. For example, a control channel transmission region may be limited to a region within a sub-channel having the smallest index in a slot having the smallest index. In this case, if there are insufficient resources for transmission of the control channel in the corresponding region, the index of the sub-channel may be preferentially increased, and then the index of slot may be increased to configure the control channel resource region.

Resource Reservation for Sidelink Communication

In the NR-V2X sidelink communication, resource configuration for data transmission and reception between terminals may be performed based on sensing operations of the terminals. In this case, for the sensing operation, the terminal may refer to information of control channels of other terminals through a decoding process. Accordingly, the terminal may reserve a resource to be used for data communication and notify it in advance to avoid collision of data transmission and reception between other terminals. In general, signaling for the resource reservation is transmitted by a terminal that intends to use the corresponding resource, and other terminals, including a terminal receiving data through the resource, may also monitor the resource reservation signaling to refer to future resource use. In this case, the resource reservation method may vary according to a case when retransmission is performed according to HARQ feedback information for data transmission and a case when initial transmission and retransmission are performed a predetermined number of times without HARQ feedback (i.e., blind retransmission).

In general, when retransmission is performed according to HARQ feedback information for data transmission, control information may be configured by additionally including information on a resource reserved for the next retransmission in the scheduling information required for the data transmission. For example, in case of initial transmission of data, control information including scheduling information for the initial transmission may be configured to also include information on a resource reserved for a first retransmission, and the first retransmission of data may be performed through the reserved resource when the HARQ feedback information for the corresponding data transmission indicates NACK. In this case, the control information including the scheduling information for the first data retransmission may also include information on a resource reserved for a second retransmission. In this manner, the reserved resource information for the next transmission may be sequentially included in the control information for the current data transmission.

On the other hand, when initial transmission and retransmission are performed a predetermined number of times without HARQ feedback for data transmission, in addition to the method of including only the information of the resource reserved for the next transmission in the control channel for current data transmission as described above, a method of reserving resources needed for all transmissions at once may be used. In this case, information on the resources reserved for a plurality of remaining retransmissions may be included in the control information for initial data transmission, or separate control information may include information on resources reserved for initial transmission and multiple retransmissions.

When configuring information on a resource reserved for data transmission at the next transmission time (hereinafter referred to as 'second data transmission time') with reference to the current data transmission time (hereinafter referred to as 'first data transmission time'), the size of the necessary control information may be reduced relatively, and may respond more flexibly to a varying channel and traffic condition. Exemplary embodiments of the present disclosure may provide methods for efficiently signaling information on the reserved resource, when the control information for data transmission at the first data transmission time includes information on the resource reserved for data transmission at the second data transmission time.

Hereinafter, it is assumed that the control information for data transmission at the first data transmission time includes scheduling information for data at the first data transmission time, and the corresponding information includes time and frequency resources (hereinafter, 'first data transmission resource') used for the data transmission.

In an exemplary embodiment, information on a resource (hereinafter referred to as 'second data transmission resource') reserved for data transmission at the second data transmission time may be signaled as an offset with respect to the data transmission resource (i.e., first data transmission resource) at the first data transmission time. More specifically, a time and frequency difference of the position of the second transmission resource may be indicated based on the position of the first transmission resource. The time and frequency difference may be represented in units of a specific time resource unit (e.g., symbol, mini-slot, slot, subframe, or frame) and in units of a specific frequency resource unit (e.g., subcarrier, resource block, or sub-channel).

In another exemplary embodiment, a predetermined processing may be required to prepare for data transmission at the second data transmission time after data transmission at the first data transmission time, and in general, a time required for the processing may be predicted in advance, and may be preconfigured. In this case, in order to indicate the difference between the first data transmission resource at the first data transmission time and the second data transmission resource at the second data transmission time, a time resource offset (e.g., time periodicity) may be used as a predetermined fixed value, a value configured semi-statically through system information or terminal-specific (i.e., UE-specific) RRC signaling, or a value transmitted separately through a specific channel, and only a frequency resource offset may be signaled, thereby reducing a signaling overhead. In this case, '+' or '−' may be applied as the frequency resource offset with reference to the first data transmission resource. In this case, only one of '+' and '−' may be applied. When only one of '+' and '−' is applied, the offset may be applied only in a specific direction based on the initial resource, and thus may deviate from the resource region for data transmission. Therefore, when only one of '+' and '−' is applied, this problem may be solved by applying a modulo operation based on the number of total frequency resource units within the resource region for data transmission.

In another exemplary embodiment, a plurality of time resource offset (e.g., time periodicity) values may be configured semi-statically to the terminal in advance through system information or UE-specific RRC signaling, and one value among the values may be dynamically selected. In this case, the signaling overhead can be reduced.

In yet another exemplary embodiment, a predetermined fixed value may be configured as the time resource offset (or, time periodicity), or a semi-static value may be configured through system information or UE-specific signaling as the time resource offset (or, time periodicity), and an offset applied in addition to the time resource offset (or time periodicity) may be signaled when configuring the second data transmission resource. In this case, it may be preferable that a time resource unit (hereinafter referred to as a 'second time resource unit') smaller than a specific time resource unit (hereinafter referred to as a 'first time resource unit') representing the time resource offset (or time periodicity) is applied to the additional offset. The second time resource unit may be applied as '+' or '−' for the time resource offset represented by the preconfigured first time resource unit. For example, in case that the time resource offset (or time periodicity) is configured in units of 1 frame, when configuring the second data transmission resource, an additional offset configured in units of the second time resource unit, such as a subframe or a slot having '+' or '−', may be applied with reference to the time resource offset (or time periodicity).

Meanwhile, when configuring the second data transmission resource through the offset with reference to the first data transmission resource, there may be a limit in a configuration range when considering a signaling overhead. Accordingly, in an exemplary embodiment, the second data transmission resource may be configured by multiplying the offset by a specific frequency interval. When the second data transmission resource is configured by multiplying the offset by a specific frequency interval, a wider range of resource configuration may be made possible. However, since it is configured in multiples of the specific frequency interval, detailed resource configuration may be difficult. Therefore, in an exemplary embodiment, when the second data transmission resource is configured by multiplying the offset by a specific frequency interval, the receiving terminal may perform blind detection on a control channel between a frequency position obtained by applying the corresponding offset (i.e., the offset obtained by multiplying the originally-signaled offset by the specific frequency interval) and a frequency position obtained by applying an offset smaller than the corresponding offset. More specifically, when offset values of {−2, −1, 0, 1, 2} are defined, and the specific frequency interval is 2 sub-channels, the range of frequency positions that can be configured by the offset values according to the above-described scheme may be increased to {−4, −2, 0, 2, 4}. In this case, when a frequency position required for actually configuring the second data transmission resource is '3', '2' may be signaled as the offset. The terminal may obtain a frequency position '4' by multiplying the offset (i.e., '2') by the frequency interval (i.e., '2'), and perform blind detection on a control channel between the corresponding frequency position '4' and the frequency position corresponding to the smaller offset (e.g., '3'). Through the above-described scheme, the complexity of the receiving terminal may be increased, but the second data transmission resource may be more efficiently configured.

The specific frequency interval may be determined in advance, or may be configured through system information, UE-specific RRC signaling, or a separate specific channel. Alternatively, a frequency interval allocated for data transmission in the first data transmission resource may be used as the specific frequency interval. In the exemplary embodiment of the present disclosure, the unit of the specific frequency interval is limited to a sub-channel, but other basic frequency units such as subcarriers and resource blocks may also be applied as the unit of the specific frequency interval. In addition, although the above-described exemplary embodiments have described a resource configuration method in the frequency domain, the same may be applied also to the resource configuration in the time domain.

Considering the signaling overhead in the method of signaling the time or frequency offset with reference to the first data transmission resource, it may be difficult to inform the accurate position of the second data transmission resource when the actual position of the second data transmission resource is out of the range that can be configured through the signaling. To solve this, a specific value may be set to indicate that the corresponding resource is out of the signaling range by the offset. More specifically, when configuring the second data transmission resource by using the offset with reference to the first data transmission resource, if there is a limit to the size of control information for configuring the second data transmission resource, the range of the offset values may be limited according to the size of the control information. Accordingly, when the position of the second data transmission resource is out of the signaling range using the offset with reference to the first data transmission resource, it may be notified to the terminal that the position of the second data transmission resource does not exist in the corresponding signaling range. In this case, when the control information for configuring the position of the second data transmission resource indicates a specific state (e.g., specific value), it may indicate that the position of the second data transmission resource is out of the signaling range. Alternatively, a separate indicator may be used to indicate that the position of the second data transmission resource is out of the signaling range. When it is determined that the information indicating the position of the second data transmission resource is out of the signaling range, the receiving terminal should perform blind detection to find the second data transmission resource outside the signaling range. Alternatively, a direction (e.g., '+' offset direction or '−' offset direction) out of the position signaling range of the second data transmission resource may be indicated with reference to the first data transmission resource, together with the information indicating that the position of the second data transmission resource is out of the signaling range. Accordingly, since the terminal only needs to perform a blind detection operation for finding the position of the second data transmission resource in the '+' or '−' direction out of the signaling range, the number of blind detections may be reduced. Alternatively, when it is determined that the position of the second data transmission resource is out of the signaling range, it may be determined that the second data transmission resource has been released. In this case, the terminal may determine that the second data transmission resource does not exist separately, and may perform a normal data reception operation.

Release of Reserved Sidelink Resources

As described above, in the NR-V2X, resources for initial transmission or retransmission of sidelink data may be reserved. When it is no longer necessary to use the second data transmission resource at the second data transmission time, the reservation of the second data transmission resource may be released to allow other terminals to use the second data transmission resource. In order to release the reservation of the second data transmission resource, a terminal (hereinafter, 'reservation terminal' for convenience) that has reserved the second data transmission resource may transmit a separate release signal to other terminals. Alternatively, when other terminals monitor HARQ feedback information for data transmitted by the reservation terminal, and the HARQ feedback information for the data transmitted by the reservation terminal indicates ACK, it may be determined that the second data transmission resource reserved by the reservation terminal will not be used for data transmission of the reservation terminal. However, the second data transmission resource reserved by the reservation terminal may be used for initial transmission of data other than retransmission of the data transmitted at the first data transmission time. In this case, other terminals determining whether the reservation of the second data transmission resource is released through monitoring of the HARQ feedback information cannot determine whether the corresponding second data transmission resource will be used for retransmission of the data transmitted at the first data transmission time or used for initial transmission of data other than the previous data. If the number of retransmissions including the initial transmission of the data is predetermined, it may be implicitly determined that the second data transmission resource will be used for initial transmission of data other than the previous data after the maximum number of retransmissions. However, in the case of the second data transmission resource before the maximum number of retransmissions, even when the feedback information for the previous data indicates ACK, it may be difficult for other terminals to determine whether the second data transmission resource will be used for initial transmission of data other than the previous data. Therefore, in an exemplary embodiment, the signaling for the second data transmission resource may include information on whether the corresponding second data transmission resource can be used only for retransmission of the data transmitted at the first data transmission time or can be used for initial transmission of data other than the previous data. More specifically, when the reservation terminal indicates that the corresponding second data transmission resource can be used only for retransmission of the data transmitted at the first data transmission time through a separate indication method, other terminals may perform monitoring on the HARQ feedback information for the data transmitted by the reservation terminal, and determine whether the HARQ feedback information for the corresponding data indicates ACK. When the HARQ feedback information is determined to indicate ACK, other terminals may determine that the reservation of the corresponding second data transmission resource has been released. On the other hand, when the corresponding second data transmission resource is configured as capable of being used for initial transmission of data other than the previous data, even if other terminals determine that the HARQ feedback information for the data transmitted by the reservation terminal indicates ACK through monitoring on the HARQ feedback information for the corresponding data, other terminals may determine that the reservation of the corresponding second data transmission resource has not been released. In both of the above-described cases, if the feedback information for the data transmitted at the first data transmission time indicates NACK, the terminal may determine that the corresponding second data transmission resource is to be used for retransmission of the data transmitted at the first data transmission time.

Figure 12:
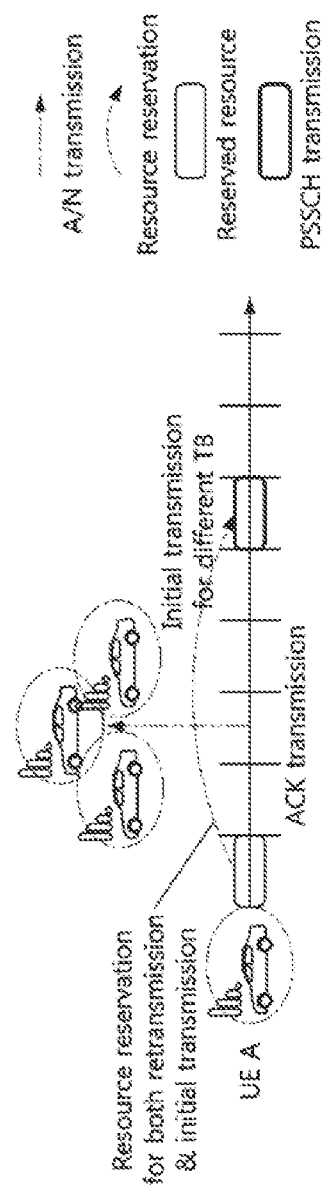

FIGS. 10 to 12 are conceptual diagrams for describing transmission resource allocation in a communication system.

Referring to FIG. 10, when a control channel for data transmission at a first data transmission time of a specific terminal (e.g., UE A) includes information on a second data transmission resource for data transmission at a second data transmission time, and feedback information for the data transmission at the first data transmission time indicates NACK, the corresponding second data transmission resource may be used for retransmission of the data transmitted at the first data transmission time.

Referring to FIG. 11, when a control channel for data transmission at a first data transmission time of a specific terminal (e.g., UE A) includes information on a second data transmission resource for data transmission at a second data transmission time, but the second data transmission resource is configured to be reserved only for retransmission of the specific terminal (i.e., UE A), if feedback information for the data transmission at the first data transmission time indicates ACK, other terminals may determine that the reservation of the corresponding second data transmission resource has been released, and use the second data transmission resource for data transmission of other terminals.

Referring to FIG. 12, when a control channel for data transmission at a first data transmission time of a specific terminal (e.g., UE A) includes information on a second data transmission resource for data transmission at a second data transmission time, and the corresponding second data transmission resource is configured to be reserved for retransmission of the specific terminal (i.e., UE A) or initial transmission of other data, even if feedback information for the data transmitted at the first data transmission time indicates ACK, other terminals may not determine that the reservation of the corresponding second data transmission resource has been released, and determine that the corresponding second data transmission resource will continue to be used for data transmission (initial transmission of the data other than the previous data of the specific terminal (i.e., UE A)).

In order to indicate whether the second data transmission resource can be used only for retransmission of the data transmitted at the first data transmission time or can be used also for initial transmission of data other than the previous data, a separator indicator (e.g., indication bit) may be added to the control channel including scheduling information of the first data transmission resource for the data and information on the second data transmission resource. Alternatively, control information may indicate the corresponding information when a part of the control information indicates a specific state (e.g., all '0's or '1's). More specifically, the above-described information may be represented by indicating that the offset for configuring the second data transmission resource is out of the signaling range. Alternatively, the indicator may be configured in form of additional information applied only in a specific mode. In this case, whether the system operates in the specific mode, that is, whether the second data transmission resource is used only for retransmission for the transmission data at the first data transmission time or for initial transmission of data other than the previous data may be configured in advance through system information or UE-specific RRC signaling. More specifically, when the second data transmission resource is configured to be used not only for retransmission of data transmitted at the first data transmission time but also for initial transmission of data other than the previous data, periodicity information may be additionally configured to periodically reserve the corresponding transmission resources, so that the corresponding transmission resources are used for periodical traffic transmission. In this case, the additional periodicity information itself may be transmitted together with the configuration information of the transmission resources. Alternatively, a set of periodicity information may be configured in advance through system information, etc., and an index indicating specific periodicity information in the preconfigured set of the periodicity information may be transmitted together with the configuration information of the transmission resources.

When the configuration information of transmission resources and the periodicity information (or index information indicating the periodicity) are configured together, and thus the transmission resources are periodically configured, the configured resources may be suitable for periodic traffic transmission. However, since the resources configured as described above are determined to be reserved for data transmission, they may be excluded from a group of transmission resource candidates during resource sensing and selection for data transmission resources of other terminals. When the data transmission resource is configured by combining the configuration information of transmission resources and the periodicity information as described above, the corresponding resources may be continuously and infinitely configured according to the configured periodicity. Since the corresponding resources are determined to be reserved, they are also excluded from the resource sensing and selection process for data transmission resources of other terminals, so if they are not used for actual transmission, they may remain resources that are not actually used, resulting in resource waste. Accordingly, exemplary embodiments of the present disclosure propose a method for preventing the periodic resource reservation from being configured infinitely by limiting application of the periodicity information when the configuration information of transmission resources and the periodicity information are configured as combined.

As a method of limiting the application of periodicity information, an upper limit of the number of resources to which the periodicity information is applied may be configured, or a timer may be configured so that the periodicity information is applied only within the configured number of resources or until the timer expires. In this case, the configured upper limit of the number of resources to which the periodicity information is applied or a value of the timer may be preconfigured to the terminal through system information or UE-specific RRC signaling. Alternatively, information on a counter may be transmitted with the periodicity information, and the counter may be decremented or incremented each time the periodicity information is applied to resources. Accordingly, when the counter reaches 0 or a specific value configured in advance through system information or UE-specific RRC signaling, the application of the periodicity information may be stopped. Alternatively, a specific state of a specific field of control information including the configuration information of transmission resources and the periodicity information may indicate deactivation of the periodic resource configuration, without using the upper limit of the number of resources to which the periodicity information is applied or the timer. More specifically, the specific field of the control information may be a field indicating the periodicity information, and the periodic resource configuration may be deactivated through the periodicity information indicating a specific state (e.g., a specific value ('0')). As another example, the specific field of the control information may be a field indicating periodicity information preconfigured through system information or UE-specific RRC signaling, and the deactivation of the periodic resource configuration may be indicated when the indicated preconfigured periodicity information represents a specific state (e.g., a specific value ('0')).

When it is determined by other terminals that the reservation of the second data transmission resource by the reservation terminal has been released, a priority for the preference of using the second data transmission resource may be increased by a plurality of terminals, so that a probability of collision between transmissions and receptions by the plurality of terminals in the corresponding second data transmission resource may increase rather. Accordingly, exemplary embodiments of the present disclosure propose a method for reducing collisions due to increases in usage preferences by other terminals for the second data transmission resource for which reservation has been released. More specifically, even when it is determined that the reservation of the second data transmission resource, which has been reserved by the reservation terminal, has been released, the priority for the usage preference of the second data transmission resource may not be increased. A plurality of terminals determining that the reservation of the second data transmission resource has been released may set the priority of usage preference for the second data transmission resource to be the same as the priority of other resources. That is, in the resource selection process, a method of not increasing a probability of selecting the second data transmission resource as compared to other resources may be applied. Alternatively, terminals capable of selecting and using the released second data transmission resource may be limited. When terminals capable of selecting and using the released second data transmission resource are limited to some terminals according to a specific criterion, the probability of collisions in the corresponding second data transmission resource may be reduced. As the specific criterion that can be applied in this case, a distance between the reservation terminal and each terminal may be used. By using the distance from the reservation terminal, the probability of collisions in the corresponding second data transmission resource may be reduced by giving a priority of using the released second data transmission resource to terminals within a predetermined distance from the reservation terminal. Alternatively, a magnitude of a signal transmitted from the reservation terminal, such as RSRP, may be measured and applied by each terminal. The priority of using the released second data transmission resource may be given to terminals in which the signal of the reservation terminal is measured as having a value equal to or greater than a predetermined value, thereby reducing the probability of collisions in the second data transmission resource. In this case, the distance or the magnitude of the measurement signal, that can be used as a reference, may be determined in advance, configured statically or semi-statically through system information, etc., or dynamically configured through a control channel, etc.

In the above description, the feedback information may be transmitted through a specific channel. More specifically, the specific channel may be a physical sidelink feedback channel (PSFCH), which is a sidelink feedback transmission channel. In addition, the reservation signal, the control signal for the separate indication method (i.e., indication on whether or not the second data transmission resource is used only for retransmission of the data transmitted at the first data transmission time), etc., the periodicity information, or the data and control information may be transmitted on specific channel(s). More specifically, the specific channels may be a physical sidelink shared channel (PSSCH) and a physical sidelink control channel (PSCCH), which are sidelink data and control information transmission channels. In the above exemplary embodiments, the first data transmission resource and the second data transmission resource have been described, but these are for convenience of description, and the exemplary embodiments of the present disclosure may be applied to reservation of more data transmission resources. Meanwhile, the exemplary embodiments of the present disclosure have been described based on sidelink communication between terminals, but are not limited to the sidelink communication between terminals, and may be applied to general uplink and downlink communications. The exemplary embodiments of the present disclosure have been described based on transmission and reception of sidelink data, control information, and feedback information, but are not limited thereto.

Backward Indication

As described above, in the NR-V2X, the resources for initial transmission or retransmission of sidelink data may be reserved. In this case, two or three transmission resources including a transmission resource to be currently used may be reserved through one control information. In this case, how many transmission resources can be configured by one control information may be predefined by the technical specification or configured by the base station to the terminals. Also, two or three transmission resources including the transmission resource to be currently used may be configured only within a predetermined time period. For example, when configuration of three transmission resources is possible, the three transmission resources may be defined as a first data transmission resource, a second data transmission resource, and a third data transmission resource. The control information transmitted together with data in the respective transmission resources may be defined as first control information, second control information, and third control information. In this case, when the first data transmission resource and the second data transmission resource are located within a predetermined time period, but the third data transmission resource is located out of the predetermined time period, the third data transmission resource may not be configured, and only the two data transmission resources located within the predetermined time period, that is, the first data transmission resource and the second data transmission resource may be configured.

When a plurality of transmission resources are configured within a predetermined time period and a plurality of control information are transmitted together with a plurality of data channels in the respective transmission resources, each control information may redundantly indicate resource allocation for the plurality of transmission resources within the predetermined time period. For example, when the first data transmission resource, the second data transmission resource, and the third data transmission resource are configured within a predetermined time period, and the first control information, the second control information, and the third control information are transmitted together with data in the respective transmission resources, each of the first control information, the second control information, and the third control information may redundantly include resource allocation information for the first data transmission resource, the second data transmission resource, and the third data transmission resource located within the predetermined time period. Through the configuration in this manner, when a receiving terminal attempts to detect specific control information within the predetermined time period, but a reception thereof fails, the receiving terminal may identify configuration of the plurality of transmission resources through other control information. For example, even when the receiving terminal fails to receive the second control information, the receiving terminal may obtain configuration information of the first data transmission resource, the second data transmission resource, and the third data transmission resource through the first control information and/or the third control information. However, in this case, since the receiving terminal does not know which order the corresponding control information has among the first, second, and third control information, a method for solving the problem is needed. Accordingly, exemplary embodiments of the present disclosure propose a method for adding information indicating which order the corresponding control information has among the plurality of control information.

More specifically, when it is possible to configure two transmission resources within a specific time period, it may be indicated by using 1-bit information whether the control information currently transmitted is the first control information or the second control information. When it is possible to configure three transmission resources within a specific time period, it may be indicated by 2-bit information whether the control information currently transmitted is the first control information, the second control information, or the third control information.

As described above, if it is known to the receiving terminals which order each of the control information has within a specific time period, the receiving terminal can obtain the entire configuration information of the plurality of transmission resources within the specific time period even when receiving only some of the plurality of control information within the specific time period, thereby reducing a probability of data transmission failure of the corresponding terminal or a probability of collisions between transmission data of terminals, which may occur due to the failure to receive some control information.

In the above description, the control information may be transmitted through a specific channel. More specifically, the specific channel may be first-stage control information (e.g., sidelink control information (SCI)) of the sidelink. In the above-described exemplary embodiments, the number of resources that can be configured within a specific time period is limited to 2 or 3, but this is for convenience of description, and the above exemplary embodiments may also be applied to reservation of more data transmission resources.

Figure 13:
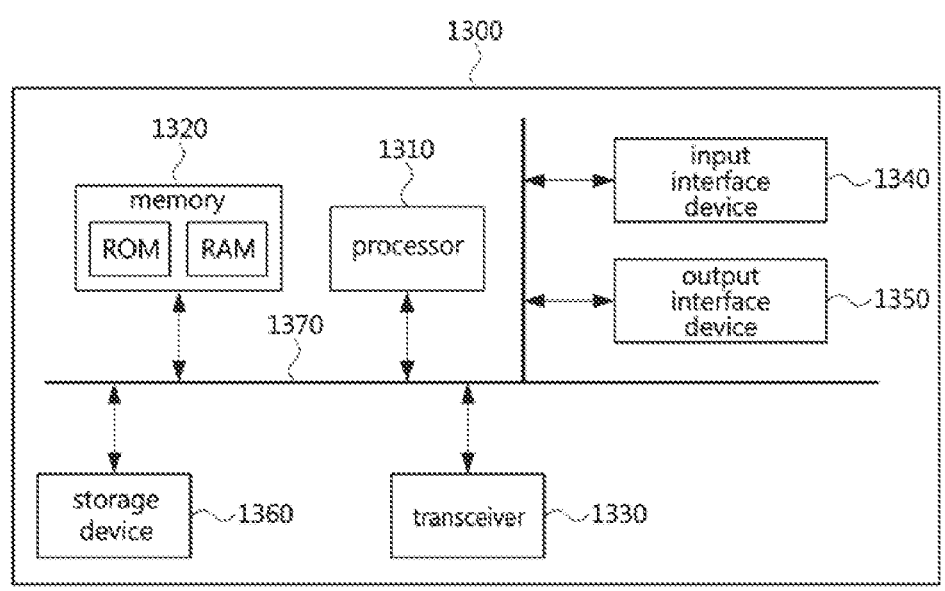
FIG. 13 is a block diagram illustrating a configuration of an apparatus for performing methods according to exemplary embodiments of the present disclosure.

FIG. 13 is a block diagram illustrating a configuration of an apparatus for performing methods according to exemplary embodiments of the present disclosure.

The exemplary configuration illustrated in FIG. 13 may be applied to the above-described transmitting terminal or receiving terminal, and the same or similar structure may be applied to the base station.

Referring to FIG. 13, a terminal 1300 may include at least one processor 1310, a memory 1320, and a transceiver 1330 connected to a network to perform communication. In addition, the terminal 1300 may further include an input interface device 1340, an output interface device 1350, a storage device 1360, and the like. The components included in the terminal 1300 may be connected by a bus 1370 to communicate with each other. However, each component included in the terminal 1300 may be connected to the processor 1310 through a separate interface or a separate bus instead of the common bus 1370. For example, the processor 1310 may be connected to at least one of the memory 1320, the transceiver 1330, the input interface device 1340, the output interface device 1350, and the storage device 1360 through a dedicated interface.

The processor 1310 may execute at least one instruction stored in at least one of the memory 1320 and the storage device 1360. The processor 1310 may refer to a central processing unit (CPU), a graphics processing unit (GPU), or a dedicated processor on which the methods according to the exemplary embodiments of the present invention are performed. Each of the memory 1320 and the storage device 1360 may be configured as at least one of a volatile storage medium and a nonvolatile storage medium. For example, the memory 1320 may be configured with at least one of a read only memory (ROM) and a random access memory (RAM).

The at least one instruction may be configured such that the processor 1310 performs each of the steps constituting the data transmission method or data reception method according to the above-described exemplary embodiments of the present disclosure, and all information exchanged between the terminals or between the base station and the terminal may be transmitted or received through the transceiver 1330 under the control of the processor 1310.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A sidelink (SL) communication method performed by a first terminal in a communication system, the SL communication method comprising:
   transmitting, to a second terminal, first sidelink control information (SCI) indicating a first transmission resource and one or more second transmission resources;
   transmitting a first redundancy version (RV) of a first transport block (TB) to the second terminal through the first transmission resource; and
   when a first configuration indicator is not set, transmitting a second RV of the first TB to the second terminal through a resource among the one or more second transmission resources; and when the first configuration indicator is set, transmitting the second RV of the first TB or a first RV of a second TB other than the first TB to the second terminal through a resource among the one or more second transmission resources,
   wherein configuration information including a list of candidate periodicities for the one or more second transmission resources is received from a base station, and when the first configuration indicator is set, the first SCI further includes an index indicating a reservation periodicity of the one or more second transmission resources among the list of candidate periodicities.

2. The SL communication method according to claim 1, wherein the first configuration indicator is set or not set through a terminal-specific radio resource control (RRC) message.

3. The SL communication method according to claim 1, wherein the configuration information is received through a terminal-specific RRC message.

4. The SL communication method according to claim 1, wherein a number of the one or more second transmission resource(s) is limited by a counter.

5. The SL communication method according to claim 1, further comprising:
   transmitting second SCI including an index indicating a reservation periodicity set to 0 for the one or more second transmission resources; and
   releasing reservation of the one or more second transmission resources.

6. A sidelink (SL) communication method performed by a second terminal in a communication system, the SL communication method comprising:
   receiving, from a first terminal, first sidelink control information (SCI) indicating a first transmission resource and one or more second transmission resources;
   receiving a first redundancy version (RV) of a first transport block (TB) from the first terminal through the first transmission resource; and
   when a first configuration indicator is not set, receiving a second RV of the first TB from the first terminal through a resource among the one or more second transmission resources; and when the first configuration indicator is set, receiving the second RV of the first TB or a first RV of a second TB other than the first TB from the first terminal through a resource among the one or more second transmission resources,
   wherein configuration information including a list of candidate periodicities for the one or more second transmission resources is received from a base station, and when the first configuration indicator is set, the first SCI further includes an index indicating a reservation periodicity of the one or more second transmission resources among the list of candidate periodicities.

7. The SL communication method according to claim 6, wherein the first configuration indicator is set or not set through a terminal-specific radio resource control (RRC) message.

8. The SL communication method according to claim 6, wherein the configuration information is received through a terminal-specific RRC message.

9. The SL communication method according to claim 6, wherein a number of the one or more second transmission resource(s) is limited by a counter.

10. The SL communication method according to claim 6, further comprising:
    receiving second SCI including an index indicating a reservation periodicity set to 0 for the one or more second transmission resources; and
    releasing reservation of the one or more second transmission resources.

* * * * *